UNITED STATES PATENT OFFICE.

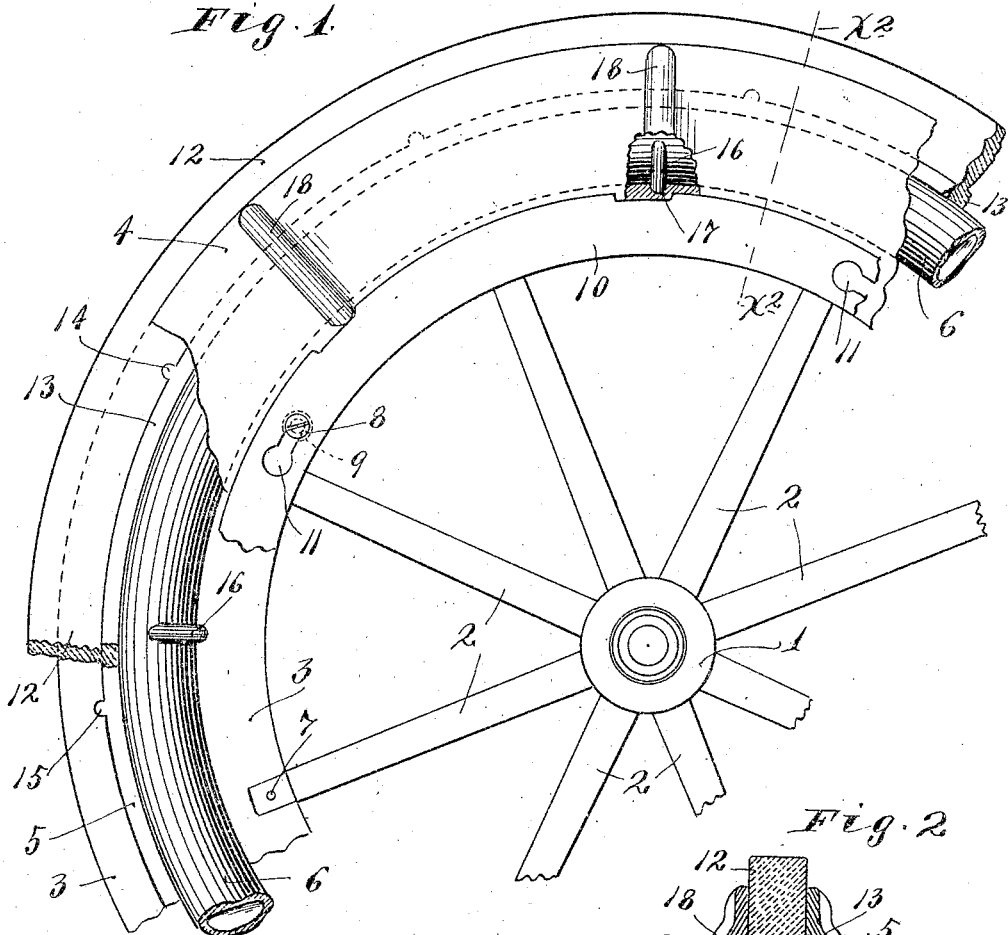

JOHN EDMAN, OF MINNEAPOLIS, MINNESOTA, ASSIGNOR TO ALFRED M. HOVLAND, OF MINNEAPOLIS, MINNESOTA.

RESILIENT WHEEL-RIM.

1,048,054.     Specification of Letters Patent.     Patented Dec. 24, 1912.

Application filed November 2, 1908. Serial No. 460,634.

*To all whom it may concern:*

Be it known that I, JOHN EDMAN, a citizen of the United States, residing at Minneapolis, in the county of Hennepin and State of Minnesota, have invented certain new and useful Improvements in Resilient Wheel-Rims; and I do hereby declare the following to be a full, clear, and exact description of the invention, such as will enable others skilled in the art to which it appertains to make and use the same.

My invention relates to resilient wheel rims, and has for its object to provide improved means for preventing the puncturing of pneumatic tires, while at the same time, preserving the resilience of the wheel rims due to the use of pneumatic tires therein.

To the above ends, the invention consists of the novel devices and combinations of devices hereinafter described and defined in the claim.

This invention is in the nature of an improvement on the resilient tire set forth and claimed by me in my prior application S. N. 417,008, filed February 21st, 1908.

In the accompanying drawings which illustrate the invention, like characters indicate like parts throughout the several views.

Referring to the drawings: Figure 1 is a fragmentary view in side elevation, showing a wheel equipped with a resilient tire, embodying my invention; Fig. 2 is a transverse section taken on the line $x^2$ $x^2$ of Fig. 1; Fig. 3 is a plan view, showing a portion of the outer or tread band or tire of the rim; Fig. 4 is a section taken on the line $x^4$ $x^4$ of Fig. 3; Fig. 5 is a detail view in plan, showing a portion of the inner pneumatic tube of the wheel rim; and Fig. 6 is a section taken on the line $x^6$ $x^6$ of Fig. 5.

The numeral 1 indicates the hub and the numeral 2 the spokes of the wheel.

The wheel rim proper is made up of annular metallic plates 3 and 4, that are reversely bulged outward in cross section to form an endless channel 5, adapted to receive with clearance, a pneumatic tube or tire 6. The inner flanges of the rim sections 3 and 4 are provided with seats that receive the outer ends of the spokes, and the said spokes are preferably permanently secured to the said rim section 3 by means of screws or rivets 7. The rim section 4 is detachably connected to the rim section 3, preferably by headed screws or studs 8, that are secured to the inner flange of the rim section 3 and are projected loosely through perforations 9 in the inner flange of the rim section 4. The said perforations 9 are of such size that they permit the heads of the studs 8 to freely pass therethrough. A lock ring 10 is seated against the outer flange of the rim section 4, and is provided with lock notches 11 having enlarged ends, through which the heads of the studs 8 are adapted to be freely passed. When the ring is turned so that the slots 11 engage under the heads of the studs 8, the two sections 3 and 4 are locked together as shown in the drawings, but when said lock ring is turned so that the enlarged ends of the slots 11 are alined with the heads of the studs 8, the said lock ring may be moved laterally from working position, thereby releasing the rim section 4, so that it may also be moved laterally off from the studs 8 and from working position.

The outer flanges or portions of the rim sections 3 and 4 are parallel so that they are adapted to receive an endless tread rim or band 12, that is preferably formed from a single continuous piece of solid rubber. This tread tire 12 is approximately rectangular in cross section, and at its inner edge, it is provided with outwardly projecting stop flanges 13 that fit grooves formed in the rim members 3 and 4, just inward of their parallel outwardly extended flanges, see Fig. 2. At suitable intervals, these flanges 13 are formed at their outer sides, with projecting lugs 14 entering notches 15 formed in both of the rim members 3 and 4 at their inner faces immediately adjacent the grooves for the flanges 13. When the tire 6 is inflated, the lugs 14 will be tightly pressed into the notches 15 and the outer rim or tire 12 will be held against creeping movement, in respect to the rim sections 3 and 4.

To prevent creeping of the pneumatic tire 6 within the rim sections 3 and 4, it is provided with anchoring ribs 16, that preferably run about one-half way around the tire and are located at the inner portion thereof. These ribs 16 engage segmental transversely extended grooves 17 formed in the bottom of the channel 5, that is, in the rim sections 3 and 4.

The rim sections 3 and 4, should, of course, be made as light as consistent with proper strength, and hence, they are reinforced by radial ribs 18. Preferably also, the grooves 17 are alined with the ribs 18 so that the former constitute cavities or grooves within the latter.

The pneumatic tire, is, as is evident, protected in such a manner that it cannot possibly be punctured. At the same time, its resilience is added to that of the outer or tread tire 12, so that a wheel rim of the proper resilience, and at the same time, of the proper strength is afforded.

What I claim is:

In a resilient wheel, a wheel rim forming a channel-like tire seat having outwardly extending flanges, a continuous annular tread tire located between the rim flanges, a pneumatic inner tire or cushion in the tire seat of said rim provided with a plurality of transverse segmental anchoring ribs in its inner surface, each rib extending approximately half way around the tire, anchoring grooves of corresponding shape formed in the tire seat to receive the said segmental anchoring ribs on the inner tire, and reinforcing ribs formed on the rim in alinement with the grooves in the tire seat, substantially as described.

In testimony whereof I affix my signature in presence of two witnesses.

JOHN EDMAN.

Witnesses:
H. D. KILGORE,
F. D. MERCHANT.